United States Patent
Kim

(10) Patent No.: US 9,307,153 B2
(45) Date of Patent: Apr. 5, 2016

(54) METHOD AND APPARATUS FOR PREVIEWING A DUAL-SHOT IMAGE

(71) Applicant: Samsung Electronics Co., Ltd., Gyeonggi-do (KR)

(72) Inventor: Moon-Soo Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/190,386

(22) Filed: Feb. 26, 2014

(65) Prior Publication Data

US 2015/0009349 A1    Jan. 8, 2015

(30) Foreign Application Priority Data

Jul. 5, 2013  (KR) ........................ 10-2013-0079005

(51) Int. Cl.
*H04N 5/232*   (2006.01)
*H04N 5/247*   (2006.01)
*H04N 5/225*   (2006.01)
*H04N 5/272*   (2006.01)

(52) U.S. Cl.
CPC ......... *H04N 5/23293* (2013.01); *H04N 5/2258* (2013.01); *H04N 5/23229* (2013.01); *H04N 5/247* (2013.01); *H04N 5/272* (2013.01)

(58) Field of Classification Search
CPC ... H04N 5/262; H04N 5/2621; H04N 5/2624; H04N 5/265; H04N 5/272; H04N 5/23229; H04N 5/247
See application file for complete search history.

(56) References Cited

U.S. PATENT DOCUMENTS

| | | | |
|---|---|---|---|
| 7,991,285 B2* | 8/2011 | Tan ................................ | 396/322 |
| 8,988,558 B2* | 3/2015 | Chong et al. ................... | 348/239 |
| 2003/0117501 A1* | 6/2003 | Shirakawa .................. | 348/218.1 |
| 2005/0046740 A1* | 3/2005 | Davis ............................ | 348/373 |
| 2005/0249433 A1* | 11/2005 | Ohbuchi ........................ | 382/284 |
| 2006/0017832 A1* | 1/2006 | Kemppinen ............. | 348/333.11 |
| 2010/0053212 A1* | 3/2010 | Kang et al. .................... | 345/629 |
| 2012/0057028 A1* | 3/2012 | Tanaka .......................... | 348/169 |
| 2012/0274808 A1* | 11/2012 | Chong et al. .................. | 348/234 |
| 2014/0232743 A1* | 8/2014 | Na et al. ........................ | 345/629 |

FOREIGN PATENT DOCUMENTS

| KR | 10-2008-0043492 A | 5/2008 |
|---|---|---|
| WO | 00/64144 A1 | 10/2000 |

* cited by examiner

*Primary Examiner* — Nicholas Giles
(74) *Attorney, Agent, or Firm* — Cha & Reiter, LLC

(57) ABSTRACT

A dual-shot image preview method and apparatus is disclosed. An electronic device with dual image sensors provides a preview screen combining in real-time a partial image captured from a first image sensor and a rear image captured from a second image sensor. The partial image is a portion of a front image that includes a desired portion of the user, such as the user's face based on algorithmic detection. The electronic device displays a dual-shot preview screen by overlaying the partial image on the rear image.

22 Claims, 6 Drawing Sheets

METHOD AND APPARATUS FOR PREVIEWING A DUAL-SHOT IMAGE

CLAIM OF PRIORITY

This application claims the benefit under 35 U.S.C. §119 (a) of a Korean patent application filed on Jul. 5, 2013 in the Korean Intellectual Property Office and assigned Serial No. 10-2013-0079005, the entire disclosure of which is incorporated hereby incorporated by reference.

TECHNICAL FIELD

The present disclosure relates generally to a method and apparatus for previewing front and rear dual-shot images taken by an electronic device.

BACKGROUND

The rapid growth of communication technologies has led to the development of new and innovative electronic devices and electronic device functionality. One area which has seen rapid growth is in the development of various User Interface ("UI") schemes and UI functionality. Additionally, the drive to improve the usefulness of existing electronic devices and meet end-user requirements has resulted in the advancement of even basic application programs.

As many such electronic devices include cameras (such as cell phones, smart phones, tablets and portable personal computers), camera-related applications in particular have already seen advancement from basic camera functions that merely allow visual capture of a subject, to functions enabling the sharing of captured images to other users through text messaging, e-mail or social media. Captured images may also be altered or edited for a variety of purposes. For example, there now exist various image editing applications that allow a user to perform a variety of simple or even complex editing tasks, such as adding filters, removing red-eye, or even altering major aspects of the photo (e.g., changing the hair style of a person in a photo).

The hardware of these electronic devices have also seen advancements in utility and functionality. For example, many modern electronic devices are now equipped with two cameras, one placed on a front-facing surface of the electronic device, and one placed on a rear-facing surface of the electronic device. This enables a plurality of functions such as live video-chatting, easier capture of self-portraits, etc. Another relatively new function involves the display of both the front image and rear image taken by the front and rear-facing cameras, respectively. In this so-called "Dual-Shot Mode," the front image is combined with the rear image to form a composite image. The main image (captured by the rear-facing camera) may be, for example, overlaid with a sub-image (captured by the front-facing camera) in something resembling a Picture-in-Picture ("PIP") format. This may allow users to capture an event or thing of interest (taken by the rear-facing camera) while simultaneously capturing his or her own expression or reaction to the event (taken by the front-facing camera).

However, problems arise when users attempt utilize Dual-Shot Mode, because users must then consider and capture two image compositions simultaneously. In conventional Dual-Shot Mode, the front image is displayed in a PIP "box" over the rear image (the placement of the front image PIP "box" is usually predetermined, but changeable within the picture composition). It is typically difficult to set proper shot compositions for the front image. Particularly, the face is usually lopsided in any resulting front image compositions, being more heavily weighted towards one side of the captured image, especially if the viewing angle of the front camera is wide.

Also, when the front image PIP "box" (which may also be called a sub-image) is relatively small compared to the size of the full composite image, the user may have difficulty confirming the quality of the sub-image, due to its size limitation within the preview screen.

Furthermore, because the user must trigger the capture button with one hand, and steady the electronic device with the other hand, the electronic device may sway, resulting in an out-of-focus image. Therefore, the composite image is often of poor quality, resulting in user dissatisfaction.

The above information is presented as background information only to assist with an understanding of the present disclosure. No determination has been made, and no assertion is made, as to whether any of the above might be applicable as prior art with regard to the present invention.

SUMMARY

The present invention aims to at least partly solve, mitigate, or eliminate at least one of problems and/or shortcomings relating to the prior arts.

The present invention is a method and apparatus for previewing dual-shot images and facilitating the capture of dual-shot photographs. The method and apparatus utilize a partial image that consists of an algorithmically recognized subject portion, such as a user's face. The present invention facilitates composition of combined dual-shot images by previewing dual-shot images in real-time.

In accordance with one aspect of the present invention, an electronic device apparatus for previewing dual-shot images is disclosed. The electronic device apparatus includes a first image sensor for capturing a front image, a second image sensor for capturing a rear image, an image signal processor for performing image processing on images captured by the first and second image sensors, and a controller for setting an area of pixels of interest according to algorithmic recognition of a subject from the front image. The first image sensor is instructed to output a partial image based on the area of pixels of interest, and the image signal processor create a combined dual-shot image by overlaying the partial image on the rear image. The combined dual-shot preview image is then displayed.

In accordance with another aspect of the present invention, a method for previewing dual-shot images captured in an electronic device is disclosed. A desired subject part in a front image captured by a first image sensor is algorithmically recognized. An area of pixels of interest is set depending on where the desired subject part is recognized in the front image. The first image sensor is instructed to output a partial image corresponding to the area of pixels of interest. A combined dual-shot image is created by overlaying the partial image on a rear image captured by the second image sensor. The combined dual-shot image is previewed on a display.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other features and advantages of the present invention will become more apparent by describing in detail example embodiments thereof with reference to the attached drawings in which.

DETAILED DESCRIPTION

Figure 1:
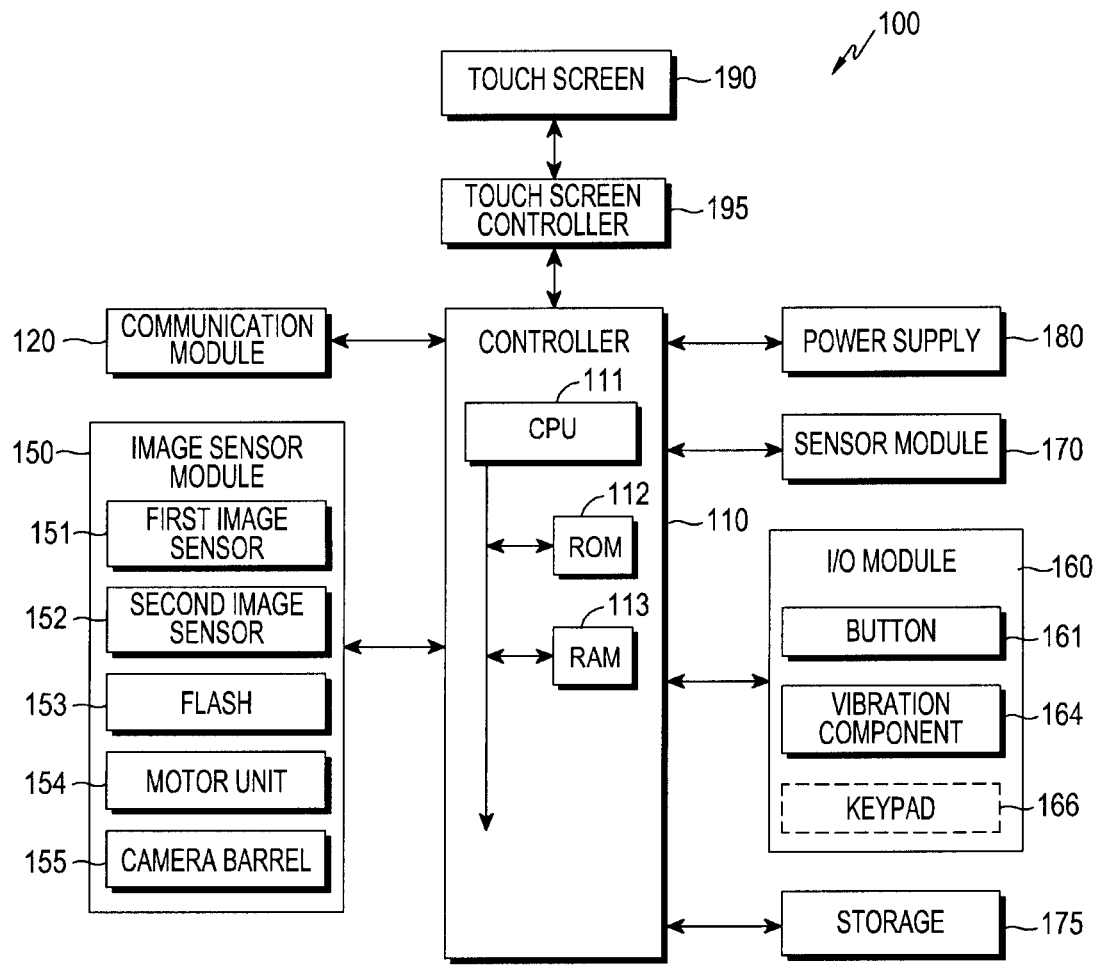
FIG. 1 is a block diagram illustrating a configuration of an electronic device, according to an embodiment of the present invention.

The invention will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numerals may be understood to refer to like parts, components, and structures throughout the disclosure.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could be termed a "second" element, component, region, layer or section without departing from the teachings of the present invention. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the invention.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A dual-shot image preview method and apparatus is hereinafter disclosed in detail. An electronic device apparatus may be equipped with dual image sensors, which may be a front-facing camera and a rear-facing camera. A preview dual-shot image may be displayed on a screen of the electronic device. The preview dual-shot image preferably displays a rear image captured by a rear-facing camera of the electronic device, which may be used to capture a "subject" image or (generally) a rear image. When dual-shot mode is activated, the electronic device may also capture a "user" image, "foreground" scenery image or (generally) a front image, utilizing the front-facing camera of the electronic device. The front-facing camera is preferably instructed to output a part of the image that only includes desired elements of the front image, as indicated by the user, which may be, for example, a portion of the user's body (e.g., the user's face, particularly). This may be determined based on information designating a pixel-based area of interest which includes the part of the user (e.g., the user's face). The electronic device may then display a dual-shot preview screen by overlaying the front image over the rear image. Any potential image processing is therefore performed only for a relatively small area of the front image, which has the added advantage of reducing computational requirements and power consumption.

FIG. 1 is a block diagram illustrating a configuration of an electronic device, according to an embodiment of the present invention. The electronic device described herein may constitute any device that has a display unit and a front and rear-facing camera. The electronic device may also be referred to as a "portable device," "mobile terminal," "communication terminal," "portable communication terminal," "portable mobile terminal," etc. For example, the electronic device may be a smartphone, a cell phone, a game console, a television, a display device, a vehicle head unit, a notebook computer, a laptop, a tablet Personal Computer (PC), a Personal Media Player (PMP), a Personal Digital Assistant (PDA), or any other similar electronic device. The electronic device may be implemented as a pocket-sized portable communication terminal that has wireless communication functionality. The electronic device may also be a flexible display device. Any other device that is equipped with at least two image sensors may also be used to execute or enable the present invention. In some embodiments of the present invention, a portable device will be taken as a representative example of the electronic device, but it should be understood that some components of the portable device may be omitted or replaced.

Referring now to FIG. 1, the electronic device 100 may include a touch screen 190 and at least one touch screen controller 195. The touch screen 190 and the touch screen controller 195 may be implemented as a display unit and a display controller, respectively. The electronic device 100 may also include a controller 110, a communication module 120, an image sensor module 150, an input/output module 160, a sensor module 170, storage 175, and a power supply 180.

The controller 110 may include a Central Processing Unit (CPU) 111, Read Only Memory ("ROM") 112 for storing an operating system to control the electronic device 100, and Random Access Memory ("RAM") 113 for storing signals or data input from external sources, or for use as computational memory space and executing applications in the electronic device 100. The CPU 111 may utilize one or more processor cores, and may therefore be implemented as a dual core, triple core, or quad core device, etc. As is typical for any computational device, CPU 111, ROM 112, and RAM 113 may be interconnected via an internal bus.

The controller 110 may control the communication module 120, the image sensor module 150, the input/output module 160, the sensor module 170, storage 175, the power supply 180, the touch screen 190, and the touch screen controller 195.

The communication module 120 may include at least one of a mobile communication module, a Wireless Local Area Network ("WLAN") module, and a short-range communication module. The communication module 120 may connect the electronic device 100 to an external electronic device through mobile communication using one or more antennas. The mobile communication module transmits/receives wireless signals for voice calls, video conference calls, Short Message Service ("SMS") messages, or Multimedia Message Service ("MMS") messages to/from a cell phone, a smart phone, a tablet PC, or other electronic devices. The WLAN module preferably allows connection to the Internet via a wireless Access Point (AP) (not depicted). The WLAN module preferably supports WLAN standard IEEE802.11x.

The short-range communication module may enable short-range communication between the portable terminal 100 and an external electronic device. The short-range communication may be implemented as, for example, Bluetooth, Infrared Data Association ("IrDA"), WiFi-Direct, Near Field Communication ("NFC"), etc., and may include one or more short-range communication solutions.

The image sensor module 150 may include a plurality of pixels arranged in an M×N matrix, and each pixel may include a photodiode and at least one transistors. The pixel accumulates an electric charge generated by incident light (that is, via an exposure process), and a voltage based on the accumulated electric charge indicates an illuminance of the incident light (that is, via an image data output process). When an image (which may be a still image or a moving image, such as an animation or video) is processed, image data output from the image sensor module 150 includes a set of voltages (that is, pixel values) output from the pixels, and the image data indicates one image (that is, a still image). The image includes M×N pixels. The image sensor module 150 may be a Charge-Coupled Device (CCD) image sensor, a Complementary Metal-Oxide Semiconductor (CMOS) image sensor, just to name some non-limiting possibilities.

The image sensor module 150 may include, for example, first and second image sensors 151 and 152 for capturing still images or video footage. The first and second image sensors 151 and 152 provide camera functionality for the electronic device 100, and thereby preferably convert optical signals input through the lens system to electric image signals, and then send the electric image signals to the controller 110. This allows a user to shoot video footage or capture still images using the electronic device 100. The first and second image sensors 151 and 152 may each include common camera elements, such as a lens system, an aperture, etc. The following description is given with the appreciation that the first and second image sensors 151 and 152 are examples of a front camera and a rear camera, respectively.

The image sensor module 150 may also include at least one of a lens barrel 155 for enabling zoom functionality. A motor unit 154 may automate movement of the lens barrel 155. A flash unit 153 may provide an auxiliary light source required to capture a subject. In one common configuration of an electronic device, the first image sensor 151 may be placed on a front-facing surface of the electronic device 100, and the second image sensor 152 may be placed on a rear-facing surface of the electronic device 100.

The image sensor module 150 may optionally include a third image sensor (which is not depicted). Placement of the first image sensor 151 and the third image sensor adjacent to one another (typically within a range between 1 cm and 8 cm) may allow for capture of three dimensional ("3D") still images or video footage. The input/output module 160 may include at least one of one or more buttons 161, at least one vibration components 164 (for providing "haptic" feedback), and a keypad 166. However, the input/output module 160 are not limited to the aforementioned elements, but may also include other non-depicted elements, such as a microphone, a speakers, a headset jack, a mouse, a trackball, a joystick, or a cursor control such as cursor direction keys to control the movement of the cursor on the touch screen 190, etc.

The buttons 161 may be arranged on the front, side, or back of the housing (or case) of the electronic device 100, and may include at least a power/lock button, volume button, menu button, home button, back button, or a search button.

The vibration component 164 may convert an electric signal to a mechanical vibration, and thereby provide tactile feedback to the user. The electronic device 100 may trigger the vibration component 164 when, for example, the electronic device 100 receives a voice or video call from another device. The vibration component 164 may also operate in response to user inputs through the touch screen 190. One or more vibration components 164 may be installed in the electronic device 100 to provide different types of vibration or different amounts of vibration, as required.

The keypad 166 may receive key inputs from the user to facilitate control of the electronic device 100. The keypad 166 may include a mechanical keypad, or a virtual keypad displayed on the touch screen 190. A mechanical keypad electronic device 100 may be omitted depending on the performance or structure of the electronic device 100 (particularly if use of a virtual keypad is desired or advantageous).

The sensor module 170 preferably includes at least one sensor for detecting a status or condition of the electronic device 100. For example, the sensor module 170 may include a proximity sensor for detecting proximity of a user to the electronic device 100, an illumination sensor for detecting an amount of ambient light in a current environment of the electronic device 100, a motion sensor for detecting any movement of the electronic device 100 (e.g., rotation, acceleration or vibration applied to the electronic device 100), a geomagnetic sensor for detecting a direction using the geomagnetic field, a gravity sensor for detecting a direction of gravity action, and an altimeter for detecting an altitude of the electronic device 100 by measuring atmospheric pressure. The sensor module 150 may also be considered to include the image sensor module 150 to capture images (although this relationship is not depicted). Of course, sensors other than the aforementioned sensors may be added or utilized as required.

Storage 175 may be used to store signals, programs, instructions or data inputs/outputs for facilitating the operation of the communication module 120, the image sensor module 150, the input/output module 160, the sensor module 170, or the touchscreen 190. Storage 175 may store control programs and applications for controlling, executing or facilitating the various features of the electronic device 100 or the controller 110. It should be understood that the term "storage" refers not only to the storage 175, but also any other data storage, such as the ROM 112, RAM 113 in the controller 110, or a memory card (e.g., an SD card, a memory stick) installed in the electronic device 100. Storage 175 may also include a non-volatile memory, a volatile memory, a Hard Disc Drive (HDD), or a Solid State Drive (SSD).

Storage 175 may also store many different functional applications, such as Global Positioning System (GPS) applications, games, time-base alarming applications and the like, images for graphical user interface (GUI) associated with the applications, databases or data related to user information, documents, methods for handling touch inputs, background images (e.g., menu screen, standby screen, etc.) required to operate the electronic device 100, operating programs, images or video captured by the image sensor module 150, etc.

Storage 175 is preferably a machine-readable (i.e., computer-readable) medium, which may be defined as a medium acceptable for providing data to a machine to enable it to perform a particular function. Storage 175 may include non-volatile and volatile media appropriate so that the electronic device 100 may read and execute instructions stored in the media.

The machine-readable media may be implemented as, for example, floppy disks, flexible disks, hard disc, magnetic tapes, Compact Disc Read-Only Memories (CD-ROMs), optical discs, punch cards, paper tapes, RAMs, Programmable ROMs (PROM), Erasable PROMs (EPROMs), and flash-EPROMs.

The power supply 180 preferably supplies power to the electronic device 100 from one or more batteries placed inside the housing of the electronic device 100. The power supply 180 may also provide the electronic device 100 with power from an external power source via, for example, a charging cable coupled to the electronic device 100. The power supply 180 may also provide the electronic device 100 with wireless power from an external power source using wireless charging technology.

The electronic device 100 may have at least one touch screen 190 to provide the user with GUI functionality for controlling the operation of the electronic device 100 (e.g., call, data communication, broadcasting, photography etc.). The touch screen 190 may receive at least one user input made by the user's body part (e.g., a finger). The touch may be a single touch or consecutive touch movements, or any other type of touch input. The touch screen 190 may send an analog signal corresponding to the consecutive moves of the touch input to the touchscreen controller 195. The touch screen 190 may be implemented in a number of different methodologies, including, but not in any way limited to, a capacitive means, infrared means, acoustic wave means, or a combination thereof.

The term "touch" as used herein refers not only to direct contacts between the touch screen 190 and user input means, such as fingers, but also to indirect contacts, such as "hovering" (e.g., the finger being over the touch screen 190 within a detectable distance, such as within 1 cm). The detectable distance from the touchscreen 190 may vary depending on the performance or structure of the electronic device 100. The touchscreen 190 may output different values (e.g., analog voltage or current values) for different types of touch events that occur so as to distinguish between, for example, direct touch events, where the user directly touches the touch screen 190, and hover touch events, where the user hovers the input means over the touch screen 190.

The controller 110 may trigger or activate programs or functions displayed on the GUI in response to user input signals received from the touch screen controller 195. For example, the controller 110 may select or execute a shortcut icon or an object that is displayed on the touch screen 190 in response to the direct touch event or a hovering event over the shortcut icon or object. The touch screen controller 195 may also be implemented as a component function or core function of the controller 110.

The touch screen controller 195 may determine not only where the user input is made but also a hovering distance by detecting a value (e.g., a current value) output through the touch screen 190, convert the determined distance to a digital signal (e.g., a "z" coordinate), and provide the digital signal to the controller 110. The controller 110 may also detect various user inputs received through other modules, such as the image sensor module 150, the input/output module 160, the sensor module 170, etc. The user inputs may include different forms of information entered into the electronic device 100, such as touches, user gestures, voice, pupil movements, vital signs, etc. The controller 110 may control predetermined operations or functions to be performed in the electronic device 100 in response to the any combination of the user inputs.

Figure 2:
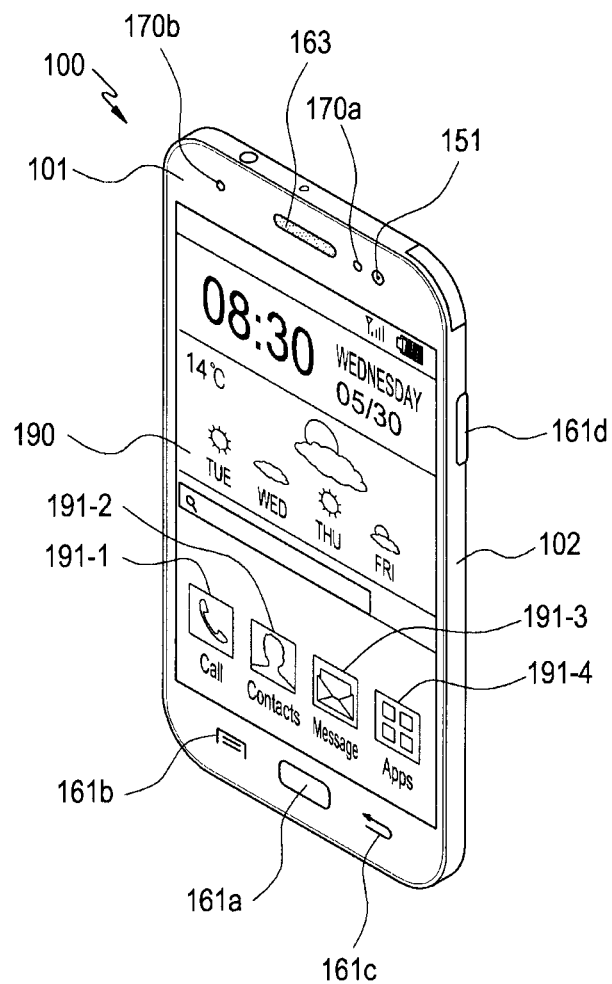
FIG. 2 illustrates a perspective view of the front face of an example smartphone electronic device, according to an embodiment of the present invention.
Figure 3:
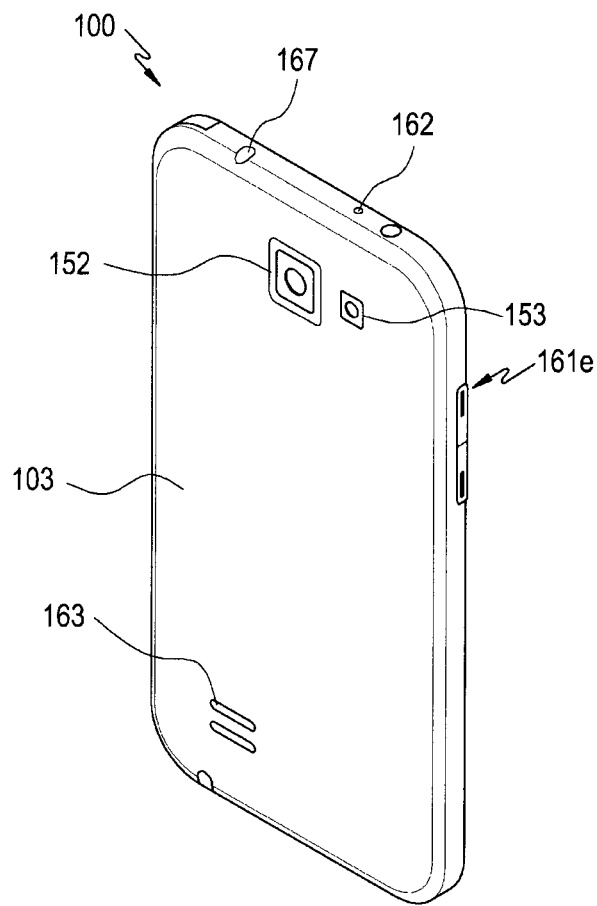
FIG. 3 illustrates a perspective view of the rear face of the example smartphone electronic device, according to an embodiment of the present invention.

FIG. 2 illustrates a perspective view of the front face of an example smartphone electronic device, according to an embodiment of the present invention, and FIG. 3 illustrates a perspective view of the rear face of the example smartphone electronic device, according to an embodiment of the present invention. Referring now to FIGS. 2 and 3, the touch screen 190 is disposed in a central spatial location of the front face 101 of the electronic device 100. The touch screen 190 may be sufficiently large as to occupy a major portion of the front face 101 of the electronic device 100. The touch screen 190 displays an example main home screen. The main home screen is a first screen to be displayed on the touch screen 190 when the electronic device 100 is powered on. If the electronic device 100 has a plurality of home screens, the "main" home screen may simply be defined as the first of the plurality of home screens preconfigured to be displayed. In the main home screen, shortcut icons 191-1, 191-2, 191-3 may be provided for accessing frequently-used applications. A main menu key 191-4 may be provided for accessing a menu illustrating all applications currently installed on the electronic device 100. Similarly, a time indicator, a weather indicator, and other functional indicators may be displayed as desired by the user.

In a lower part of the touch screen 190, there may be a number of physical buttons installed in the body of the electronic device 100, including a home button 161a, a menu button 161b, and a back button 161c.

The home button 161a, when triggered, may cause the electronic device 100 to display the main home screen on the touch screen 190. The menu button 161b provides a link menu that may be displayed on the touch screen 190. The link menu may include a widget addition menu, background change menu, search menu, edit menu, environment setting menu, etc. The back button 161c may be used to display a screen that was displayed right before a current screen, or to stop a most recently used application.

A number of sensors may be installed within the top distal portion of the front face 101 of the electronic device 100, including, for example, the first image sensor 151, the illumination sensor 170a, and the proximity sensor 170b. Similarly, referring now to FIG. 3, a number of devices may be installed on the rear face 103 of the electronic device 100, including, for example, the second image sensor 152, the flash unit 153, and the speaker 163. A number of controls and devices may be installed on the edges of the electronic device 100 as well, such as a power/lock button 161d (of FIG. 2), volume button 161e (of FIG. 3), and one or more microphones 162 (of FIG. 3).

While the electronic device 100 as described thus far comprises two image sensors 151 and 152, it should be understood that more than two image sensors may be included in the electronic device 100 in other embodiments of the present invention. Embodiments of the present invention may also be applied to a process of combining additional images taken by the more than two or more image sensors into a single image. Specifically, an image selected from among images captured by the first image sensor 151, an image selected from among images captured by the second image sensor 152, and an image selected from among images captured by a third image sensor may be combined into a single image. However, for the sake of brevity, the embodiment described herein will involve only two image sensors 151 and 152.

In one embodiment of the present invention, a combined dual-shot image is created by combining a front image and a rear image captured by the first and second image sensors 151 and 152, respectively. The rear image is obtained by capturing a desired image using the second image sensor 152 of the electronic device 100. The front image is created by capturing a subject using the first image sensor 151 of the electronic device 100. For example, the first image sensor 151 may be configured to capture an image of the user who is holding the electronic device 100, and the second image sensor 152 may be configured to capture whatever the user is currently looking at.

The controller 110 then coordinates the general operation of the electronic device 100, including the various components of the electronic device 100. Therefore, when producing a dual-shot image, upon receiving the appropriate user input, the controller 110 may instruct the first image sensor 151 to capture the front image for (in this case a picture of the user), set a pixel-area of interest that includes only the user's body from among the entire pixel-area of the captured image (which may be the user's face, hands, etc.), and then output an image corresponding to the pixel-area of interest. The controller 110 may also instruct the second image sensor 152 to capture a rear image (presumably of some object, person or landscape of interest) and output the rear image. Finally, the controller 110 may combine the rear image and the pixel-area of interest from the front image. Notably, the first image sensor 151 does not output the entire front image intact, but rather, only the image that is present within the defined pixel-area of interest, which is necessarily smaller than the front image captured within the full pixel area.

A brief description of dual-shot mode and best-shot mode will be provided as follows, as it will be useful in understanding the present invention. Dual-shot mode refers to the capture of two images simultaneously or sequentially with two different image sensors, wherein the two images are combined into a single image. Best-shot mode refers to the taking of a series of photos, and the selection of a "best" photo from among the series of photos based on a predetermined classification bias which determines which images are more desirable. The predetermined classification basis may correspond to, for example, respective numerical values of an amount of blur, a face expression, a shoot composition, etc.

Figure 4:
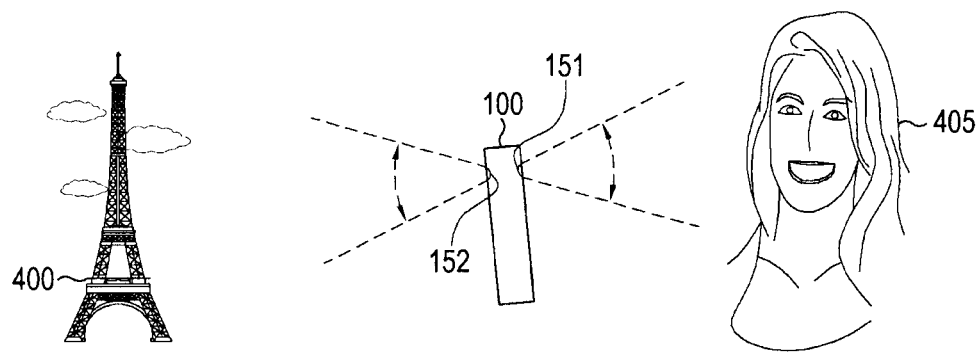
FIG. 4 is an abstract illustration visualizing the capture of images with dual image sensors of an electronic device, according to an embodiment of the present invention.

The dual-shot mode will be described in more detail with reference to FIG. 4. FIG. 4 is an abstract illustration visualizing the capture of dual-shot images with dual image sensors of an electronic device, according to an embodiment of the present invention.

Referring to FIG. 4, assuming that the first and second images sensors 151 and 152 take front image and rear image photos simultaneously, or with a minimal time difference, the user must adjust the composition of the two pictures nearly simultaneously. If, for example, the user desires the capture of subject 400 with the second image sensor 152, the user must adjust the viewing angle of the second image sensor 152 so that subject 400 is within the proper viewing angle of the second image sensor 152 for the desired composition. Simultaneously, the user must also alter their own position relative to the first image sensor 151 to ensure the appropriate capture of a desirable picture of the user's face 405.

However, according to one embodiment of the present invention, taking dual-shot photos begins instead with automatic recognition of the user's face 405, which is then previewed as a real-time image. This enables the user to more easily decide whether to capture the image without altering their own position. In other words, rather than extracting the user's face from a still image taken by the first image sensor 151, and subsequently combining the extracted area into a rear image, this embodiment of the present invention, the first image sensor 151 can output a partial image which includes the minimum area having the recognized face, and the second image sensor 152 outputs a rear image in an original size. A combined image is created by overlaying the partial image on the rear image, thereby providing a real-time live preview of a potential dual-shot image on a frame-by-frame basis. Therefore, before the capture of any image, the user may review the composition of the front image comprising their face 405 through a live preview screen where the user's face 405 is tracked and displayed.

According to one embodiment of the present invention, the first image sensor 151 can expose all pixels of the first image sensor 151 or only pixels of a region of interest among all pixels of the first image sensor 151, according to a control signal received from the ISP 156 or the controller 110, and image data output from the pixels is output to the ISP 156.

Accordingly, the present invention provides a first live preview image captured by the first image sensor 151 and a second live preview image captured by the second image sensor 152 at the same time. Thus, the first live preview image outputs from a part of pixels of the recognized face among all pixels of the first image sensor 151.

In the dual-shot mode, first and second preview images by the first and second image sensors 152 respectively are captured in real time (or with some degree of time difference) and are displayed in one screen. The user may analyze the first and second preview images to decide when to take a dual-shot photo. The preview images are preferably configurable. For example, the front image may be displayed over the rear image, according to a PIP format or, alternatively, they may be configured to display the preview images in user-designated sizes at user-designated positions. For example, the preview screens may split certain areas of the screen, or they may each be displayed at full size individually.

A resolution of the first preview image captured by the first image sensor 151 may be different from that of the second preview image captured by the second image sensor 152. For example, the resolution of the preview image from the second image sensor 152 may be higher than that from the first image sensor 151. This may be a common implementation as the resolution of rear-facing cameras is often higher than that of front-facing cameras, which is often considered an ancillary or supplemental camera. In some embodiments of the present invention, the controller 110 may determine and select the user's face 405 from the front image and instruct the first image sensor 151 to output a partial image that only includes the user's face. The partial image may then be combined with the rear image to form the final dual-shot image. This results in a drastic decrease in calculation and power consumption, because the partial image is necessarily smaller than the full front image, and, as a result, requires less processing by the electronic device 100.

Figure 5:
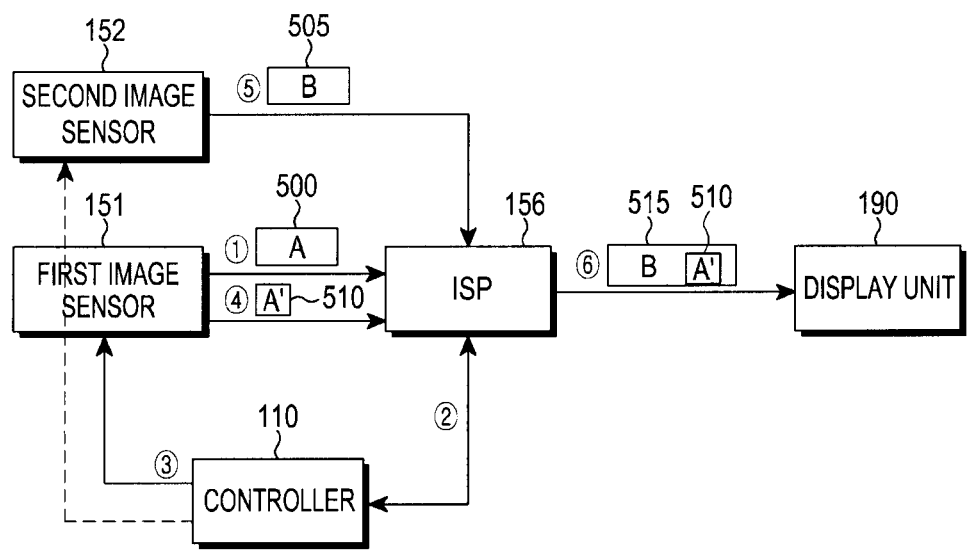
FIG. 5 is a block diagram illustrating a configuration of an electronic device for implementation of a dual-shot image preview, according to an embodiment of the present invention.

FIG. 5 is a block diagram illustrating a configuration of an electronic device for implementation of a dual-shot image preview, according to an embodiment of the present invention. The electronic device 100 may further include an Image Signal Processor ("ISP") 156. ISP 156 may receive real-time images captured by the image sensor module 150, process the images to fit desired visual characteristics (size, quality, resolution, etc.), and display the processed images. The processing of the images may include, for example, gamma correction, interpolation, spatial changes, image effects, image scaling, Automatic White Balance ("AWB"), Automatic Exposure ("AE"), Automatic Focusing ("AF"), etc. The touch screen 190 displays the high-quality images received from the ISP 156. The controller 110 controls the image sensor module 150 and/or the ISP 156, facilitating and coordination the execution of image processing.

When an application requiring use of the image sensors 151 and 152 is triggered (e.g., a camera application), the first image sensor 151 is activated by the controller 110. The first image sensor 151 may send an image signal 500 output consisting of the full pixel-range of the first image sensor 151 to the ISP 156. ISP 156 may then perform signal processing on the image signal 500. Any and all pixel information output from the ISP 156 may be used for algorithmically recognizing a portion of the user (e.g., the user's face, hands, etc.), and is therefore preferably processed to an extent such that detection or recognition of the subject part may be easily made. That is, despite the desire to convert images into the high-quality image to better fit visual characteristics of the touch screen 190, if it is only possible to recognize the subject part from a low-quality image, then the pixel information should be processed to such an extent as to create a low-quality image.

Subsequently, the controller 110 receives the pixel information processed by the ISP 156. The controller 110 then preferably selects a portion from the full range of pixels comprising the image to define a pixel-area of interest, thereby creating a partial image of a predetermined size, with the subject portion (e.g., a user's face 405) centered within.

The pixel-area of interest is used to create an image that includes a only a desired and recognized subject portion (such as a user's face 405), and the number pixels within the pixel-area of interest is necessarily less than that of the full range of pixels in a captured front image, but greater than the number of pixels comprising the desired subject portion. For example, the size of the pixel-area of interest may correspond to the minimally sized rectangle that full encloses the image of the user's face (depending on where the subject portion is recognized by the controller 110). Naturally this rectangle will be smaller than the full front image as captured by the first image sensor 151, but larger than the desired subject portion, as the user's face is enclosed by the rectangle, but does not comprise all the pixels in the rectangle.

The controller 110 preferably analyzes the pixel information of the front image, as received from the ISP 156, and determines a proper pixel-area of interest, effectively selecting the portion of the front image to be overlaid on the rear image captured by the second image sensor 152. The controller 110 determines the proper pixel-area of interest by recognizing a desired subject portion using features from processed pixel information of the front image. The controller 110 then sets the pixel-area of interest to be an area that fully encloses the desired subject portion.

The desired subject portion may be recognized algorithmically utilizing, for example, image pattern algorithms. The controller 100 may set the pixel-area of interest based on such known pattern information, which may comprise image patterns of faces, hands, etc. The controller 110 may alternatively recognize the subject portion based on a number of "learning model" algorithms.

Once the controller 110 recognizes the subject portion based on features from the received pixel information, the controller 110 may instruct the first image sensor 151 to output a partial image based on information regarding the position of the subject part. The first image sensor 151 preferably then outputs an image signal 510 based on the instruction corresponding only to the pixel-area of interest. Thus, the first image sensor 151 can output a live preview image output from a part of the full range of pixels. In one embodiment of the present invention, after recognition of the subject portion, the controller 110 may determine whether a change in the position of the subject portion has been made within the full range pixel-area of the first image sensor 151 in order to display a real-time preview screen through tracking of the subject portion. If the controller 110 determines that a change of the position of the subject portion has been made, the controller 110 may modify the pixel-area of interest so that the desired subject portion continues to be present in the partial image. The controller 110 thereafter instructs the first image sensor 151 to output a partial image 510 consisting of only the modified pixel-area of interest.

The outputted partial image may then be received by the ISP 156. The ISP 156 may then create a combined dual-shot image 515 by overlaying the partial image 510 over the rear image 505. This may be done automatically, or upon request by a user. If the camera mode is a combination-mode for combining a front image and a rear image, the ISP 156 preferably combines the partial image 510 with the rear image 505 by situating the partial image 510 of the pixels of interest in a predetermined or user-designated position within the rear image 505. The ISP 156 may also adjust the size of the partial image 510 to be overlaid on the rear image 505. The ISP 156 may consider the size of the rear image 505, objects that exist within the rear image 505, and other like factors when determining the proper size of the partial image 510. The partial image 510 may be overlaid on the rear image 505 either transparently or opaquely. That is, the image 510 of the pixels of interest may be overlaid such that a corresponding part of the rear image 505 is not viewable (opaque overlay) or transparently viewable (transparent overlay). The controller 110 may thus operate the first image sensor 151 and second image sensor 152 to take photos in real time, simultaneously or with a minimal time difference, to create a dual-shot preview. The present invention may also be applied to real-time images or real-time image frames that are sequentially inputted or read. The touch screen 190 may display the combined dual-shot image 515 created by the ISP 156. The method and apparatus may also be utilized when the user desires to create dual-shot images using sequentially-captured photographs. In this case, the electronic device 100 may be configured such that the second image sensor 152 first takes a picture of a subject in focus, and, after a predetermined time lag, the first image sensor 151 then takes a subject in focus (or vice versa). The images may then be overlaid automatically, creating a dual-shot image.

Figure 6A:
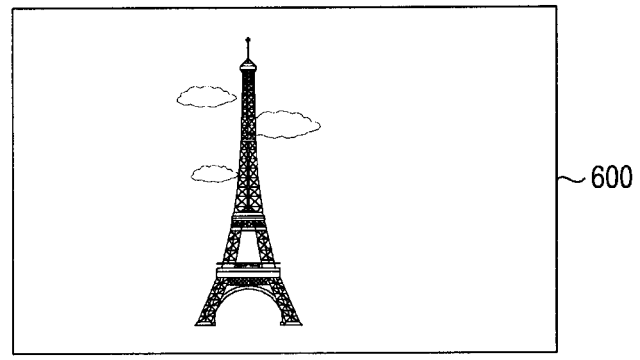
FIG. 6A is an illustration of a rear image captured by a rear-facing camera, according to an embodiment of the present invention.
Figure 6B:
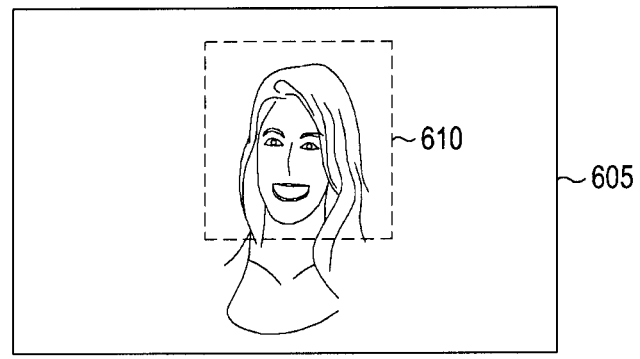
FIG. 6B is an illustration of a front image captured by a front-facing camera, according to an embodiment of the present invention.

FIG. 6A is an illustration of a rear image captured by a rear-facing camera, according to an embodiment of the present invention, and FIG. 6B is an illustration of a front image captured by a front-facing camera, according to an embodiment of the present invention. Once the user executes an application that utilizes the image sensors (such as a camera application), a rear image 600 is captured by the second image sensor 152, as depicted in FIG. 6A. A front image 605 is also captured by the first image sensor 151, as depicted in FIG. 6B. This image 605 is then in turn outputted from the first image sensor 151 to the ISP 156 to the controller 110 (corresponding to the image signal 500 output from FIG. 5). The controller 110 then determines whether (when a face is the desired subject portion) a face is detected within the entire pixel image 605. If a face detected, the controller 110 sets an area 610 pixel-area of interest, with the recognized face centered thereon, and sufficiently large as the fully enclose the desired subject portion face. The controller 110 then sends information of the area 610 to the first image sensor 151. The first image sensor 151 then outputs signals from corresponding pixels of the area 610 to the ISP 156, which in turn outputs a corresponding partial image 620 of the pixels of the area 610 to the touch screen 190.

Figure 6C:
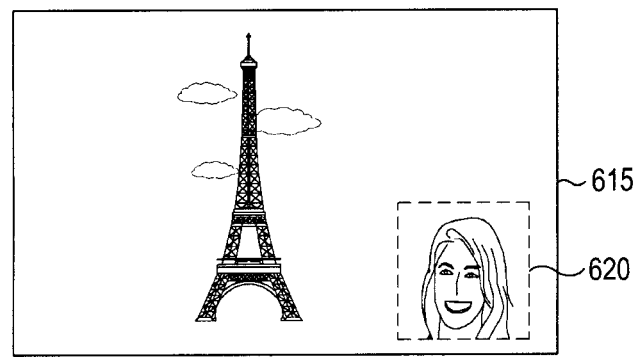
FIG. 6C is an illustration visualizing the image preview that combines the rear image of FIG. 6A and the front image of FIG. 6B, according to an embodiment of the present invention.

FIG. 6C is an illustration visualizing the image preview that combines the rear image of FIG. 6A and the front image of FIG. 6B into a dual-shot image, according to an embodiment of the present invention. ISP 156 may then overlay the partial image 620 on the rear image 600, creating the composite dual-shot image preview 615. The partial image 620 has a certain pixel size (reflecting the determined pixel-area of interest) with the subject portion (which in this case, is the user's face) centered therein. The partial image 620 may also be overlaid on the rear image 600 at a predetermined position in a PIP format, if so desired. Accordingly, the combined dual-shot image may be previewed on the touch screen 190, as depicted in FIG. 6C.

With the dual-shot image thus previewed, once a command to capture a photo is received, the controller 110 may cause in real-time a rear image 600 to be taken by the second image sensor 152, and a partial image 610 to be taken by the first image sensor. The rear image and partial image are preferably combined in accordance with the preview image 615, and then stored in the storage 175 as a single still dual-shot image.

Figure 7:
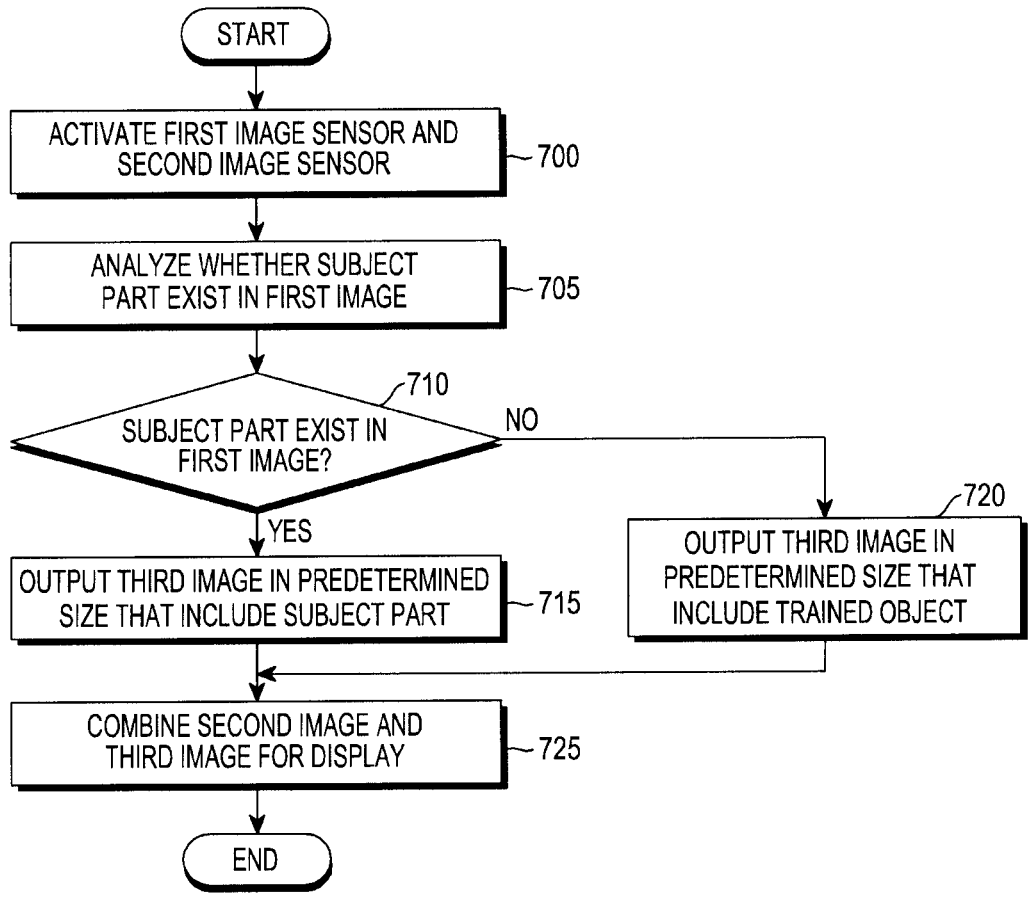
FIG. 7 is a flowchart illustrating an image previewing method, according to an embodiment of the present invention.

FIG. 7 is a flowchart illustrating a dual-shot image previewing method, according to an embodiment of the present invention. Upon execution of an application that requires the image of video capture, the controller 110 preferably activates the first image sensor 151 and second image sensor 152 in step 700, which both begin to transmit pixel information (either simultaneously, or with some minor time differentiation). In step 705, the controller 110 receives the front image, which is preferably the full pixel image from the first image sensor 151. In step 710, the controller 110 determines if the front image (or the "first" image) contains the subject portion, such as the user's face, hands, etc.

While in some embodiments of the present invention the user's face, hands, etc. may be defined as the subject part, in other embodiments where the user wants to take a picture of a foreground object, such as a building, with his/her face moved out of focus, no subject part may be found in the first image. Therefore, if the subject is not found in the first image, the controller 100 may search for features of buildings, articles, and/or objects in the first image, and set an area in which those features are distributed as an area of an object that has been learned in advance. Accordingly, in step 720, the controller 110 may output a third (i.e., "partial") image in a predetermined size that includes the object that has been learned in advance (i.e., a "trained" object). Therefore, an image of the trained object, such as a building, an animal, an article, etc., may be used to designate the pixel-area of interest. Information regarding trained objects may be stored in a database, or in storage 175 of the electronic device 100, and the pixel-area of interest may be set as a pixel-area fully enclosing the trained object.

On the other hand, if the subject portion is indeed found in the first image, then in step 715, a pixel-area of interest may be set as the minimal pixel-area necessary to fully enclose the subject portion, with the subject portion centered therein, and the controller 110 preferably outputs a third image (i.e., the partial image 620 or 510). In step 725, the controller 110 preferably combines the rear image captured by the second input sensor and the third image by overlaying the third image on the rear image, and then displays the combined dual-shot image preview on the touch screen 190.

According to one embodiment of the present invention, the user may preview a dual-shot image comprising a partial image that only includes a subject portion the user's body (rather than a full front image captured by a first input sensor). Simultaneously, the user may preview a rear image received from the second image sensor. The partial image and rear image are overlaid to create a dual-shot image preview in real-time. With the dual-shot image preview displayed on the screen, the user may arrange the composition of the photo and capture a dual-shot image when the desired composition is achieved.

The first image sensor and the second image sensor may also be referred to as a "front image sensor" and the "rear image sensor," or a "front-facing camera" and the "rear-facing camera," respectively.

Although the touch screen 190 is used herein to describe an exemplary display unit, standard displays that have no touch detection functionality may be used in place of the touch screen 190.

According to some embodiments of the present invention, when an electronic device attempts to take photos of a user and a target subject, an image of the user obtained by an image sensor module of the electronic device is adjusted to a partial image that only includes the user's face. The image sensor module may thereafter output a partial image corresponding to the area enclosing the user's face, and thus the electronic device may output a dual-shot preview screen wherein the partial image is overlaid on top of an image of the target subject.

The partial image is smaller than the entire front image but it specifically designated in area so as to include the desired subject portion of the user. This reduces calculation requirements and power consumption in performing image processing because the partial image is necessarily smaller than the full front image.

According to some embodiments of the present invention, the dual-shot preview is created by overlaying a partial image corresponding to a selected area of a front image that includes a desired subject portion of a user over a rear image in real-time. Any resulting dual-shot image captured using the preview may therefore possess a more pleasing composition.

Furthermore, according to some embodiments of the present invention, a user may capture dual-shot images by utilizing a dual-shot preview screen where an image of the user's face is overlaid on a rear image having a desired subject or scenery, the preview screen enabling creation of superior photographic composition.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

The electronic device may receive the program from a program provider wired/wirelessly connected thereto, and store the program. The program provider may include a memory for storing programs having instructions to perform the embodiments of the present invention, information necessary for the embodiments of the present invention, etc., a communication unit for wired/wirelessly communicating with the electronic device, and a controller for sending the program to the electronic device on request or automatically.

Several embodiments have been described in connection with e.g., mobile communication terminals, but a person of ordinary skill in the art will understand and appreciate that various modifications can be made without departing the scope of the present invention. Thus, it will be apparent to those ordinary skilled in the art that the invention is not limited to the embodiments described, which have been provided only for illustrative purposes.

What is claimed is:

1. An electronic device for previewing dual-shot images, comprising:
    a display screen;
    a first image sensor configured to capture a front image;
    a second image sensor configured to capture a rear image; and
    an image signal processor configured to perform image processing on images captured by the first and second image sensors;
    a controller configured to:
        store in a memory at least one trained object detectable within the front image,
        in response to a portion of a user of the electronic device being captured within the front image, setting the portion of the user as a subject part within the front image,
        in response to failing to detect the portion of the user within the front image, searching for the at least one trained object in the front image and if the at least one trained object is found, setting the at least one trained object as the subject part within the front image,
        set an area of pixels of interest based on algorithmic recognition of the subject part within the front image, the area of pixels of interest enclosing the subject part,
        output from the first image sensor a partial image based on the set area of pixels of interest and create, using the image signal processor, a combined image by overlaying the partial image on the rear image, and
        transmit the combined image to the display screen for display.

2. The electronic device of claim 1, wherein the controller is configured to determine whether the subject part exists in the front image; and set a portion of the front image that includes the subject part to be the area of pixels of interest when it is determined that the subject part exists in the front image.

3. The electronic device of claim 2, wherein the controller is configured to set a pixel area of a predetermined size with the subject part centered therein to be the area of pixels of interest.

4. The electronic device of claim 2, wherein the controller is configured to determine whether the subject part exists in the front image based on a face detection algorithm.

5. The electronic device of claim 1, wherein the image signal processor is configured to create the combined image by placing the partial image into the rear image at a predetermined position in a Picture-In-Picture format.

6. The electronic device of claim 1, wherein the partial image of the area of pixels of interest is smaller in size than the front image.

7. The electronic device of claim 1, wherein the first image sensor is configured to send the partial image to the image signal processor based on information regarding the area of pixels of interest.

8. The electronic device of claim 1, wherein the controller is configured to capture in real-time the front image and the partial image from the first image sensor and the rear image from the second image sensor for preview in the display screen.

9. The electronic device of claim 1, wherein the controller controls the first image sensor and the second image sensor to capture a partial image from the first image sensor in real-time and a rear image from the second image sensor in real-time while the combined image is previewed in the display screen; and store the combined image.

10. The electronic device of claim 1, wherein the controller is configured to determine whether there is a change in position of the subject part between a first front image and a subsequent front image captured by the first image sensor;
    upon determining that there is the change, resetting the area of pixels of interest based on algorithmic recognition of the subject part within the subsequent front image;
    output from the first image sensor the partial image based on the reset area of pixels of interest.

11. A method for previewing dual-shot images, the method comprising:

storing in a memory at least one trained object detectable within an image, algorithmically recognizing, using a processor, a subject part in a front image captured by a first image sensor;

in response to recognizing a portion of a user within the front image, setting the portion of the user as the subject part within the front image;

in response to failing to detect the portion of the user within the front image, searching for the at least one trained object in the front image and if the at least one trained object is found, setting the at least one trained object as the subject part within the front image, setting an area of pixels of interest based on recognition of a subject part in the front image, the area of pixels of interest enclosing the subject part;

instructing the first image sensor to output a partial image based on the set area of pixels of interest;

creating and transmitting a combined image by overlaying the partial image on a rear image output from a second image sensor; and displaying the combined image by displaying it on a display screen.

12. The method of claim 11, wherein the partial image of the area of pixels of interest is smaller in size than a pixel count of the first image sensor.

13. The method of claim 11, wherein setting an area of pixels of interest comprises:

determining whether the subject part exists in the front image; and setting some portion of the front image that includes the subject part to be the area of pixels of interest when it is determined that the subject part exists.

14. The method of claim 13, wherein the area of pixels of interest comprises a pixel area of a predetermined size with the subject part centered therein.

15. The method of claim 13, wherein the step of determining whether the subject part exists in the front image is performed using a face detection algorithm.

16. The method of claim 15, wherein the area of pixels of interest comprises an area of a predetermined size that includes a face recognized according to the face detection algorithm.

17. The method of claim 13, wherein the combined image comprises the partial image overlaid on the rear image at a predetermined position according to a Picture-In-Picture format.

18. The method of claim 11, wherein the front image and the partial image are captured by the first image sensor, and the rear image is captured by the second image sensor in real-time for preview.

19. The method of claim 11, further comprising:

receiving a command to capture a photo while the combined image is displayed on the display screen;

capturing a partial image using the first image sensor and a rear image using the second image sensor; and storing the combined image.

20. The method of claim 11, further comprising:

determining whether there is a change in position of the subject part between the front image and a subsequent front image captured by the first image sensor;

when it is determined that there is the change, resetting the area of pixels of interest based on algorithmic recognition of the subject part within the subsequent front image; and displaying from the first image sensor the partial image based on the reset area of pixels of interest.

21. The electronic device of claim 1, wherein the at least one trained object comprises at least one of a building and an animal.

22. The method of claim 11, wherein the at least one trained object comprises at least one of a building and an animal.

* * * * *